United States Patent
Ho et al.

(10) Patent No.: US 10,095,100 B2
(45) Date of Patent: Oct. 9, 2018

(54) PANORAMIC VIEWING SYSTEM AND METHOD THEREOF

(71) Applicant: National Taiwan Normal University, Taipei (TW)

(72) Inventors: Hong-Fa Ho, Taipei (TW); Pei-Yung Hsiao, Taipei (TW); Wen-Jui Chou, Taipei (TW); Chun-Yu Tsai, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 698 days.

(21) Appl. No.: 14/446,362

(22) Filed: Jul. 30, 2014

(65) Prior Publication Data
US 2015/0323714 A1   Nov. 12, 2015

(30) Foreign Application Priority Data
May 6, 2014   (TW) .............. 103116169 A

(51) Int. Cl.
G03B 37/06 (2006.01)
G02B 5/10 (2006.01)
H04N 5/232 (2006.01)
G03B 37/04 (2006.01)

(52) U.S. Cl.
CPC .............. *G03B 37/06* (2013.01); *G02B 5/10* (2013.01); *G03B 37/04* (2013.01); *H04N 5/23238* (2013.01)

(58) Field of Classification Search
CPC .... H04N 5/23238; G03B 37/06; G03B 37/04; G02B 5/10
See application file for complete search history.

(56) References Cited

U.S. PATENT DOCUMENTS

| | | | |
|---|---|---|---|
| 5,539,483 A | 7/1996 | Nalwa | |
| 5,793,527 A | 8/1998 | Nalwa | |
| 5,990,934 A * | 11/1999 | Nalwa | G02B 13/06 348/36 |

(Continued)

FOREIGN PATENT DOCUMENTS

TW    I268102    12/2006

OTHER PUBLICATIONS

Shree K. Nayar, Catadioptric Omnidirectional Camera, Columbia University, New York, New York, USA, 1997 IEEE, pp. 482-488.

*Primary Examiner* — Joseph G Ustaris
*Assistant Examiner* — Jill D Sechser
(74) *Attorney, Agent, or Firm* — Guice Patents PLLC

(57) ABSTRACT

The present invention provides a panoramic viewing system, which includes a panoramic reflection mirror, formed in an elliptical conical status, and the conical surface thereof is defined as a curved surface used for reflecting an ambient light source; and an image sensor, disposed at one side of the panoramic reflection mirror and used for receiving a light source from the panoramic reflection mirror so as to generate an image data; wherein the panoramic reflection mirror allows a panoramic image to be formed in a rectangular area when the panoramic image is projected by the panoramic reflection mirror to the image sensor. In addition, the present invention also discloses a method of panoramic viewing, a panoramic projecting system, a method of panoramic projecting and a panoramic image sensor.

3 Claims, 7 Drawing Sheets

(56) References Cited

U.S. PATENT DOCUMENTS

| | | | |
|---|---|---|---|
| 6,449,103 B1* | 9/2002 | Charles | G02B 13/06 359/366 |
| 2007/0029580 A1* | 2/2007 | Lung | H01L 27/14603 257/233 |
| 2007/0285811 A1* | 12/2007 | Takahashi | G02B 5/10 359/868 |

* cited by examiner

PANORAMIC VIEWING SYSTEM AND METHOD THEREOF

BACKGROUND OF THE INVENTION

1. Field of the Invention

The present invention relates to a panoramic viewing system and a method thereof, especially to a panoramic viewing system and a method thereof in which a panoramic reflection mirror is adopted to work with an image sensor or a projection device for allowing the sensed image or the projected image to be provided with a better resolution and brightness.

2. Description of Related Art

In the fields of photographing, image capturing and projecting, a specification of FOV (field of view) is provided, wherein the FOV is divided into horizontal FOV, a.k.a. HFOV, and vertical FOV, a.k.a. VFOV. The HFOV for a panoramic viewing system is 360 degree and the angle of the VFOV is not specified.

In the technical aspect for panoramic viewing, the light source projected on the sensitive material, CMOS image sensor or charge-coupled device (CCD) through a curved surface of a reflection mirror may be overlapped and the energy may not be evenly distributed on each array capacitor (or photodiode), so the capacitor (or the photodiode) may receive the photo energy with different intensity, or the projection density is not even and the photo energy could not be evenly distributed on the photodiode of each CMOS image sensor or charge-coupled device, thereby causing the image to be blur. The reason for the CMOS sensor or the charge-coupled device receiving the uneven density of signal charge is that curvature radius of the curved surface may cause the uneven density of the signal charge converted from the photo signal projected on the photodiode after the incident light is inputted to the CMOS image sensor or the charge-coupled device, the larger curvature radius of the curved surface would have a higher density projected to the photodiode of the CMOS sensor or the charge-coupled device, and the smaller curvature radius of the curved surface would have a lower density projected to the CMOS sensor or the charge-coupled device.

Take the U.S. Pat. No. 5,990,934 for example, which disclosed a method and a system for panoramic viewing, in which a pyramid shaped element is adopted and four cameras (or image sensors) are required. Thus, the production cost is relatively higher. And one other disadvantage thereof is that: the image closer to the central point of the reflection mirror of the pyramid shaped element has a lower resolution. The method and system disclosed in the technical report provided by Vishvjit S. Nalwa at 1996 (i.e. U.S. Pat. No. 5,539,483) is the same as the U.S. Pat. No. 5,990,934. The U.S. Pat. No. 5,793,527 discloses a high resolution viewing system in which four lenses and four cameras are adopted, for that reason the images obtained by the pyramid reflection mirror with lower resolution are enabled to be combined for forming a panoramic image with a higher resolution.

The report provided by S. K. Nayar at 1997 discloses another method of panoramic viewing, in which a reflection mirror having a parabolic-like curved surface is adopted (the curve formula can be found in the report), and only one camera (or image sensor) is adopted. The report improves a disadvantage of the U.S. Pat. No. 5,990,934 adopting too many cameras. However, the report has two disadvantages: first, the resolution of the image closer to the central point of curved surface of the reflection mirror is less even and lower, and the brightness is relatively darker; second, the panoramic image is formed in a circular area, so four corners of the image sensor are idled. At present, most of the products available in the market are manufactured by the method mentioned above.

The Taiwan Patent NO. I268102 discloses an image process unit, which is applicable in an image sensor, the image process unit includes a plurality of photodiodes arranged in the image sensor, the photodiodes are respectively formed with different photo sensing areas according to the arranged locations, wherein the photo sensing areas of the photodiodes are gradually enlarged from the central to the outer side, accordingly the low sensitivity due to the overly-large incident angle can be compensated and the quality of image capturing can be increased. However, the technical characteristic of said patent is just opposite to the requirement of panoramic viewing.

The U.S. Pat. No. 5,539,483 discloses a panoramic projection apparatus adopting a pyramid reflection mirror and four projection devices, the operational theory is the same as the U.S. Pat. No. 5,990,934, the difference between the two is that the light source is reversely operated for forming a projection system. It is because of the same operational theory and the same technical characteristic, four projection devices are required; therefore, the production cost is relatively higher. One disadvantage thereof is that: the image which is closer to the central point of the pyramid reflection mirror and projected to a screen would have a lower resolution.

In the aspect of image processing, the CMOS image sensor or the charge-coupled device utilizes the pixel elements composed by the array photodiodes for capturing image, the sensitivity of each pixel element refers as the intensity of the photo signal projected to the photodiode being converted into the signal charge. If the sensitivity of the photodiode for light is lowered, the density of the received signal charge would become lower, and the reality and the saturation of imaging capturing would be directly affected. In addition, because the array charge storage unit of the charge-coupled device or the CMOS image sensor would cause the density of the signal charge stored in different charge storing unit to be varied; thus, a part of the captured image may be blur.

Moreover, the reason for the CMOS sensor or the charge-coupled device receiving the uneven density of signal charge is that curvature radius of the curved surface may cause the uneven density of the signal charge converted from the photo signal projected on the photodiode after the incident light is inputted to the CMOS image sensor or the charge-coupled device, the larger curvature radius of the curved surface would have a higher density projected to the CMOS sensor or the charge-coupled device, and the smaller curvature radius of the curved surface would have a lower density projected to the CMOS sensor or the charge-coupled device. The attenuation effect would directly affect the image developing quality and cause the problem of relatively brighter in the center and relatively darker at the edge. With the light compensating technology, the photo signal at the edge can be enhanced through being focused by a software or microlens, or the effective area of favorable photo sensing area can be calculated with respect to the size of the image, however the effect is still very limited.

In view of the disadvantages existed in the conventional panoramic viewing system, the present invention provides a panoramic viewing system and a method thereof for improving the above-mentioned disadvantages.

SUMMARY OF THE INVENTION

One primary objective of the present invention is to provide a panoramic viewing system and a method thereof, which includes a panoramic reflection mirror, the conical surface thereof is defined as a curved surface, thereby allowing the density of photo signal of a light source projected by the panoramic reflection mirror to a photodiode to be evenly distributed and formed as a rectangular or non-circular image, thereby avoiding the disadvantages of uneven resolution and four corners being idled Another objective of the present invention is to provide a panoramic viewing system and a method thereof, which includes a panoramic reflection mirror, the panoramic reflection mirror can be a convex lens, a concave lens, a plane lens or a combination thereof, the projecting horizontal FOV (field of view) can be from 121 to 360 degrees, and the rectangular area can be formed as an oblong area.

One another objective of the present invention is to provide a panoramic viewing system and a method thereof, which includes a panoramic reflection mirror, four corners of the panoramic reflection mirror are respectively extended with an extended reflection mirror, accordingly images reflected by the four extended reflection mirrors are enabled to be respectively formed at four corners of the image sensor.

Still one another objective of the present invention is to provide a panoramic viewing system and a method thereof, which includes a panoramic reflection mirror, a curved surface thereof is formed in a quadratic curve status, and the gradient of the curved surface is defined by the linear relation of the image projected by the panoramic reflection mirror to an image sensor.

Still one another objective of the present invention is to provide a panoramic viewing system and a method thereof, in which during projection, a rectangular light source projected by a panoramic reflection mirror to a 360 degree screen is able to be formed with evenly-distributed density, thereby avoiding a disadvantage of uneven resolution, so a better resolution is provided.

Still one another objective of the present invention is to provide a panoramic viewing system and a method thereof, wherein the area of a photodiode adopted in an image sensor and closer to the central point of the image sensor is relatively larger, and the area of a photodiode further farer from the central point of the image sensor is relatively smaller, thereby enabling the sensed image to be provided with better resolution and brightness.

For achieving aforesaid objectives, the present invention provides a panoramic viewing system, which includes a panoramic reflection mirror, formed in an elliptical conical status, and the conical surface thereof is defined as a curved surface used for reflecting an ambient light source; and an image sensor, disposed at one side of the panoramic reflection mirror and used for receiving a light source from the panoramic reflection mirror so as to generate an image data; wherein the panoramic reflection mirror allows a panoramic image to be formed in a rectangular or non-circular area when the panoramic image is projected by the panoramic reflection mirror to the image sensor.

For achieving aforesaid objectives, the present invention provides a method of panoramic viewing, which includes the steps of: providing an image sensor; obtaining an undeveloped rectangular image or an undeveloped non-circular image from the image sensor; and developing the undeveloped rectangular image or the undeveloped non-circular image for being restored as a panoramic image.

For achieving aforesaid objectives, the present invention provides a panoramic projecting system, which includes: a storage device, served to store an image data sensed by an image sensor; a process unit, coupled to the storage device and served to process the image data so as to be outputted; a video interface unit, coupled to the process unit and served to convert the image data into a rectangular panoramic image or non-circular image light source so as to be outputted; an image projection device, coupled to the video interface unit and served to project the rectangular panoramic image or non-circular image light source; a panoramic reflection mirror, disposed above or below the image projection device and formed in an elliptical conical status, and the conical surface thereof is defined as a curved surface used for reflecting an ambient light source; and a panoramic screen, disposed at the periphery of the panoramic reflection mirror and served to enclose the panoramic reflection mirror; wherein the panoramic reflection mirror allows a rectangular or non-circular light source to be projected onto the panoramic screen for forming a 360 degree panoramic image.

For achieving aforesaid objectives, the present invention provides a method of panoramic projecting, which includes the steps of: providing a light source and an image projection device; utilizing the image projection device to project an undeveloped rectangular or non-circular image light source having evenly-distributed density to a panoramic reflection mirror; and utilizing the panoramic reflection mirror to restore the undeveloped rectangular or non-circular image light source having evenly-distributed density to a 360 degree panoramic image.

For achieving aforesaid objectives, the present invention provides a panoramic image sensor, which is used in a panoramic viewing system, the panoramic image sensor includes: a plurality of photo sensing units arranged in the image sensor, and the photo sensing units are respectively formed with different photo sensing areas according to the arranged locations, wherein the photo sensing areas of the photo sensing units are determined by an elliptical conical curved surface of a panoramic reflection mirror, the area with lower illuminance is thereof coupled with a larger photo sensing area to enhance sensitivity of reception; while the area with higher illuminance is thereof couple with a smaller photo sensing area design.

DETAILED DESCRIPTION OF THE PREFERRED EMBODIMENT

Figure 1A:
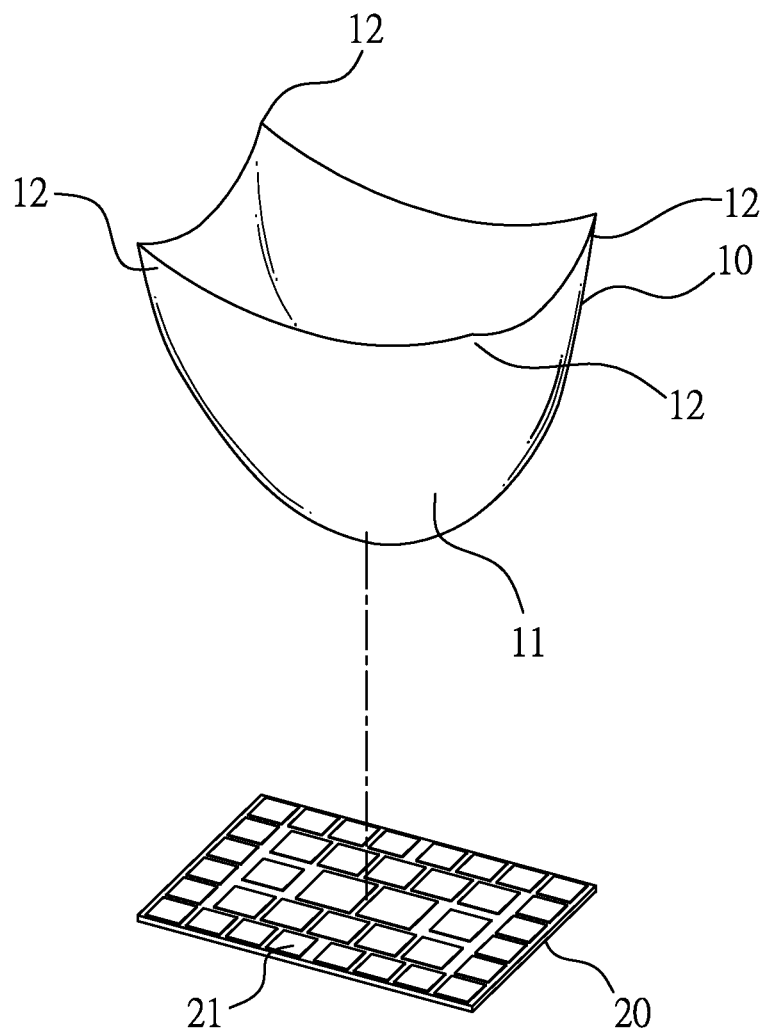
FIG. 1a is a perspective view illustrating a panoramic viewing system according to one preferred embodiment of the present invention.
Figure 1B:
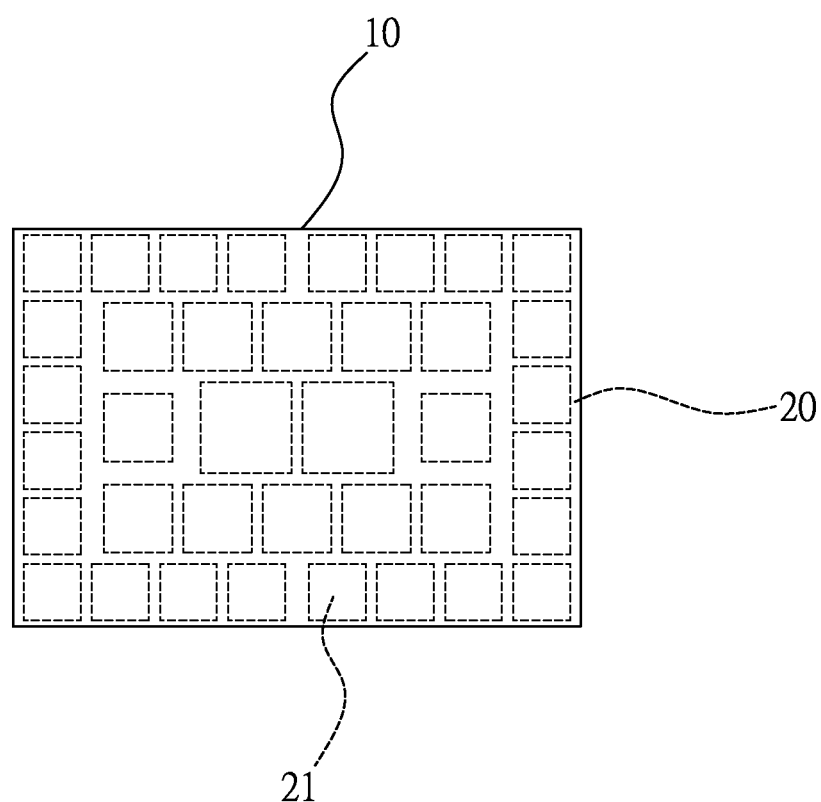
FIG. 1b is a top view illustrating the panoramic viewing system according to one preferred embodiment of the present invention.
Figure 2:
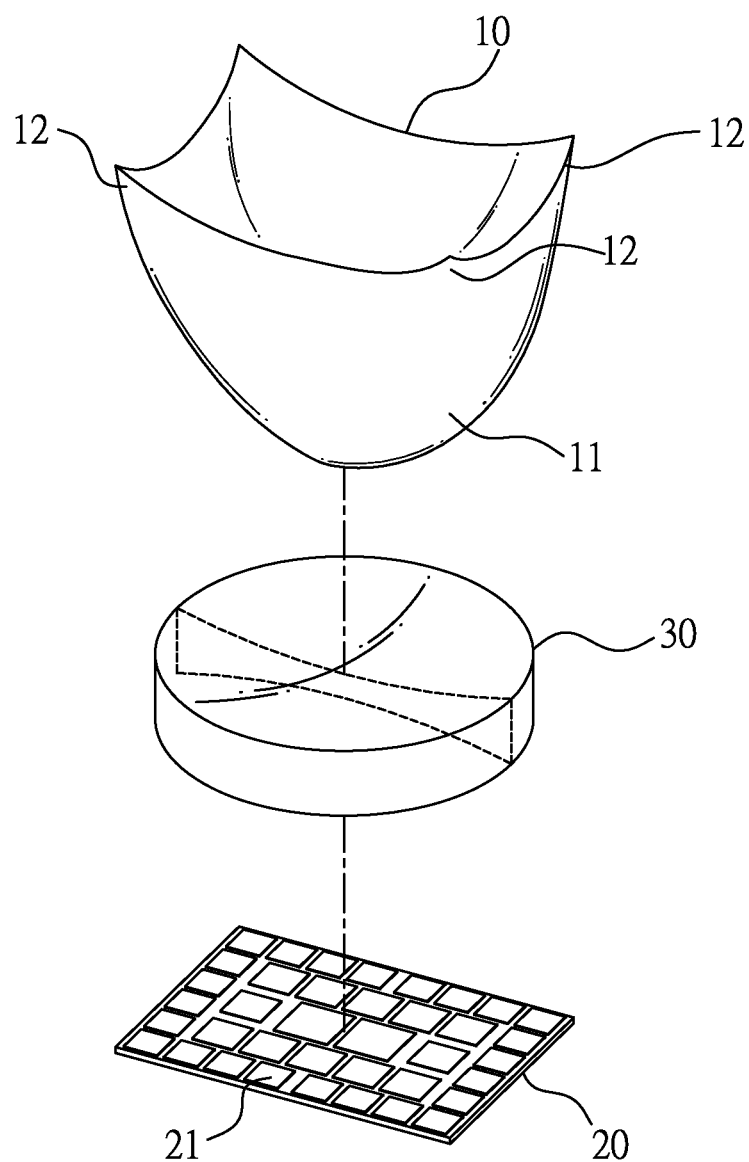
FIG. 2 is a schematic view illustrating the panoramic viewing system being further provided with a lens according to one preferred embodiment of the present invention.

Referring from FIG. 1a to FIG. 2, wherein FIG. 1a is a perspective view illustrating a panoramic viewing system according to one preferred embodiment of the present invention; FIG. 1b is a top view illustrating the panoramic viewing system according to one preferred embodiment of the present invention; and FIG. 2 is a schematic view illustrating the panoramic viewing system being further provided with a lens according to one preferred embodiment of the present invention.

As shown in figures, the present invention provides a panoramic viewing system, which includes: a panoramic reflection mirror 10 and an image sensor 20.

The panoramic reflection mirror 10 is e.g. but not limited in a formed of elliptical conical status, and the conical surface thereof is defined as a curved surface 11 used for reflecting an ambient light source, wherein the ambient light source is e.g. but not limited to a 360 degree light source; the panoramic reflection mirror 10 is e.g. but not limited to a convex lens, a concave lens or a plane lens. In addition, the projecting horizontal FOV (field of view) of the panoramic reflection mirror 10 can be from 121 to 360 degrees, and when a panoramic image is projected to the image sensor 20, the curved surface 11 allows the panoramic image to be formed as a non-circular area, and the non-circular area is preferably to be an elliptical area, wherein the elliptical area can be larger or equal to the sensing area of the image sensor 20.

Wherein, the curved surface 11 of the panoramic reflection mirror 10 is formed in a quadratic curve status, and the gradient of the curved surface 11 is defined by the linear relation of the image projected by the panoramic reflection mirror 10 to the image sensor 20. Moreover, four corners of the panoramic reflection mirror 10 are respectively extended with an extended reflection mirror 12, and each cross section of the panoramic reflection mirror 10 is formed in an elliptical status.

The image sensor 20 is disposed above or below the panoramic reflection mirror 10; according to this embodiment, the arrangement of the image sensor 20 being disposed below the panoramic reflection mirror 10 is served for illustration and shall not be a limitation to the scope of the present invention; the image sensor 20 receives the light source from the panoramic reflection mirror 10 for generating an imaging data, so when a panoramic image is projected by the panoramic reflection mirror 10 to the image sensor 20, the panoramic image is able to be formed as a rectangular area or a non-circular area, and preferably to be an oblong area, and images reflected by the four extended reflection mirrors 12 are respectively formed at four corners of the image sensor 20 (as shown in FIG. 1b), thus the shortage of four corners of the conventional image sensor being idled can be improved.

Wherein, the image sensor 20 further includes a plurality of photo sensing units 21 used for receiving the electromagnetic radiation energy generated when the reflected light source is incident to the photo sensing unit 21, so a plurality of corresponding signal charges are therefore generated, wherein the photo sensing unit 21 is e.g. but not limited to a charge-coupled device, a photodiode, a complementary metal-oxide semiconductor or other photo sensitive material.

As shown in FIG. 2, the panoramic viewing system provided by the present invention further includes a lens 30 disposed between the panoramic reflection mirror 10 and the image sensor 20, so the lens 30 can be served to provide functions such as zooming in, zooming out, partially enlarging or reducing the size, changing depth of field or other functions. Wherein, the lens 30 is e.g. but not limited to a convex lens, a concave lens, a plane lens or a combination thereof.

When the panoramic viewing system provided by the present invention is in use, the curved surface 11 of the panoramic reflection mirror 10 allows a panoramic image to be projected to the image sensor 20, so the panoramic image is able to be formed as a rectangular area or a non-circular area, and the projection density can be evenly distributed, so disadvantages of uneven resolution and four corners being idled can be improved, and the vertical FOV (field of vision) can be increased.

Figure 3:
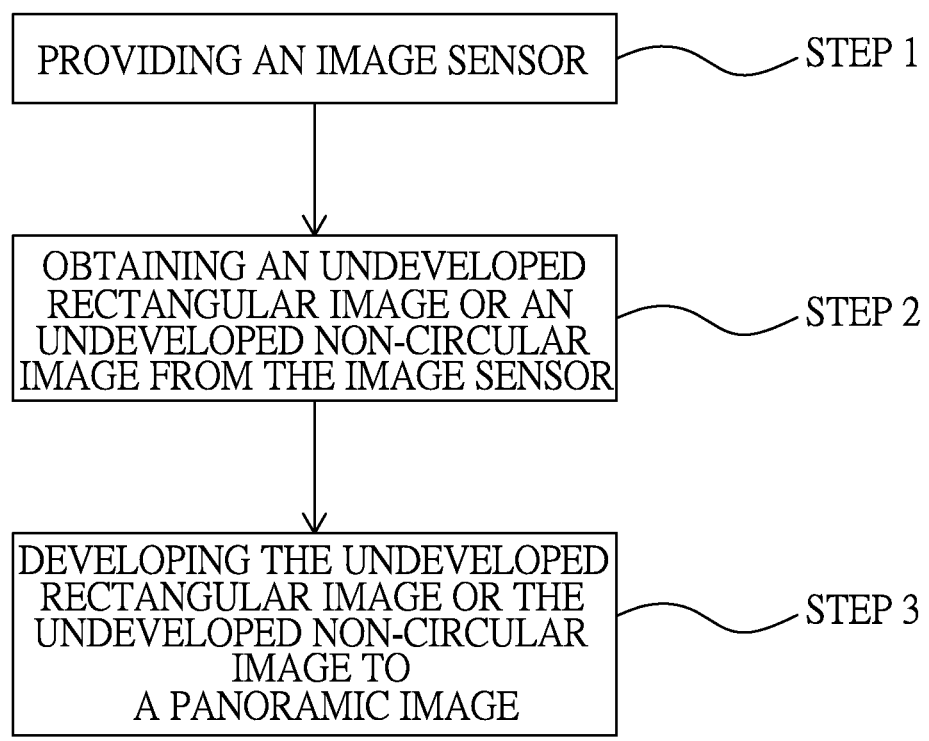
FIG. 3 is a flowchart illustrating a method of panoramic viewing according to another preferred embodiment of the present invention.

Referring to FIG. 3, which is a flowchart illustrating a method of panoramic viewing according to another preferred embodiment of the present invention.

As shown in FIG. 3, the present invention provides a method of panoramic viewing, which includes the steps of: providing an image sensor 20 (STEP 1); obtaining an undeveloped rectangular image or an undeveloped non-circular image from the image sensor 20 (STEP 2); and developing the undeveloped rectangular image or the undeveloped non-circular image to a panoramic image (STEP 3).

In the STEP 1, an image sensor 20 is provided; wherein, the image sensor 20 further includes a plurality of photo sensing units 21, which is used for receiving the electromagnetic radiation energy generated when the reflected light source is incident to the photo sensing unit 21, consequently a plurality of corresponding signal charges are therefore generated, wherein the image sensor 20 is e.g. but not limited to a charge-coupled device, a photodiode, a complementary metal-oxide semiconductor or other photo sensitive material.

In the STEP 2, an undeveloped rectangular image or an undeveloped non-circular image is obtained from the image sensor 20; wherein, the rectangular image is formed as an image with evenly-distributed density.

In the STEP 3, the undeveloped rectangular image or the undeveloped non-circular image is developed to a panoramic image; wherein, the panoramic image is a 360 degree panoramic image and formed as a panoramic image with the real-world proportion.

Figure 4:
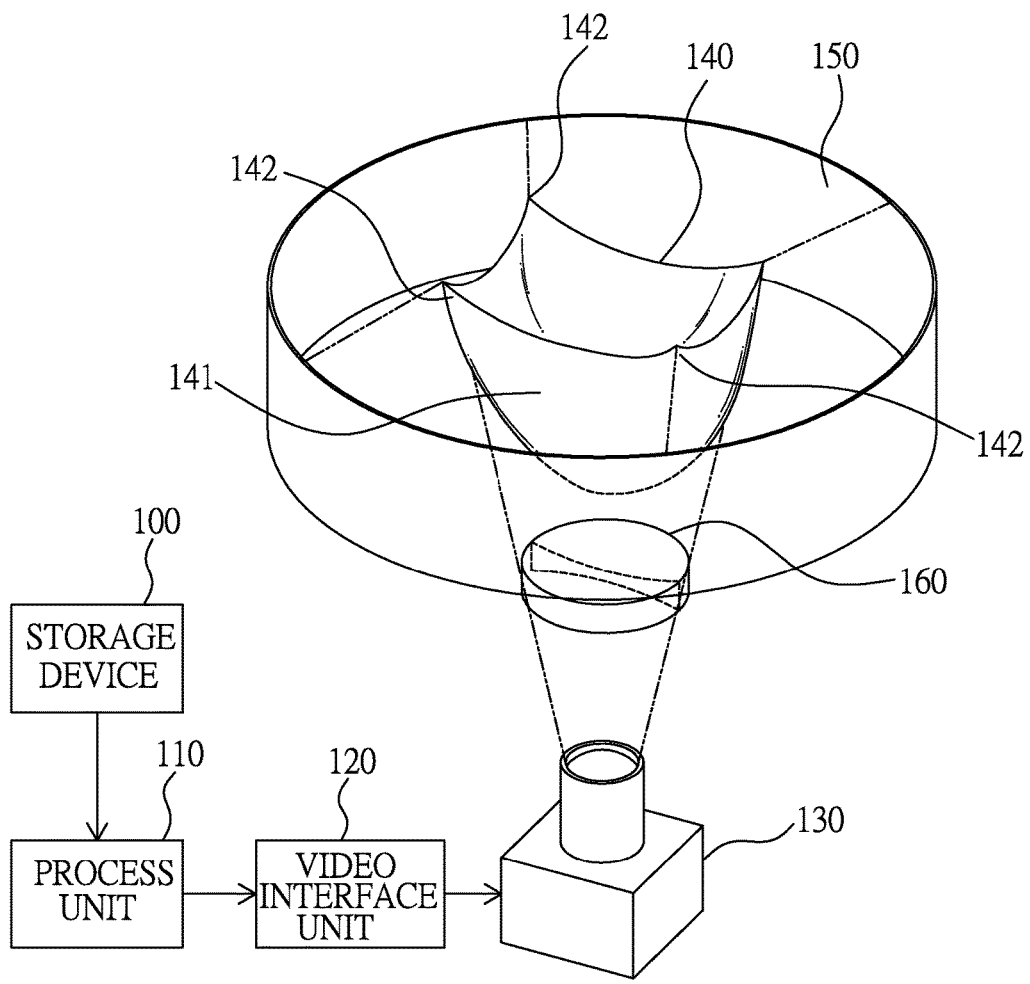
FIG. 4 is a block view illustrating a panoramic projecting system according to another preferred embodiment of the present invention.

Referring to FIG. 4, which is a block view illustrating a panoramic projecting system according to another preferred embodiment of the present invention.

As shown in FIG. 4, the panoramic projecting system provided by the present invention includes a storage device 100, a process unit 110, a video interface unit 120, an image projection device 130, a panoramic reflection mirror 140 and a panoramic screen 150.

The storage device 100 is served to store an image data sensed by an image sensor 20, wherein the storage device 100 is e.g. but not limited to a memory, the technical characteristic of the image sensor 20 is as the above-mentioned; therefore, no further illustration is provided.

The process unit 110 is coupled to the storage device 100 and served to process the image data so as to be outputted, wherein the process unit 110 is e.g. but not limited to a microprocessor or a microcontroller.

The video interface unit 120 is coupled to the process unit 110 and served to convert the image data into a rectangular or non-circular panoramic image light source so as to be outputted.

The image projection device 130 is coupled to the video interface unit 120 and served to project the rectangular or non-circular panoramic image light source, wherein the image projection device 130 is e.g. but not limited to a projector.

The panoramic reflection mirror 140 is e.g. but not limited to the form of elliptical conical status, and the conical surface thereof is defined as a curved surface 141 used for reflecting an ambient light source, wherein the curved surface 141 is formed in a quadratic curve status, and the ambient light source is e.g. but not limited to a 360 degree light source; the panoramic reflection mirror 140 is e.g. but not limited to a convex lens, a concave lens, a plane lens or a combination thereof. In addition, the projecting horizontal FOV (field of view) of the panoramic reflection mirror 140 can be from 121 to 360 degrees. Moreover, four corners of the panoramic reflection mirror 140 are respectively extended with an extended reflection mirror 142, and each cross section of the panoramic reflection mirror 140 is formed in an elliptical status.

The panoramic screen 150 is disposed at the periphery of the panoramic reflection mirror 140 and served to enclose the panoramic reflection mirror 140, wherein the process unit 110 is able to modify the image data with respect to the gradient of the curved surface 141, thereby being enabled to be formed with the same gradient as the panoramic reflection mirror 140, so the image data can be restored on the panoramic screen 150.

In addition, the panoramic projecting system provided by the present invention further includes a lens 160 disposed between the panoramic reflection mirror 140 and the image projection device 130, thus the lens 160 can be served to provide functions such as zooming in, zooming out, partially enlarging or reducing the size, changing depth of field or other functions.

Through the curved surface 141 of the panoramic reflection mirror 140 projecting a light source with a rectangular or non-circular area and having evenly-distributed density onto the panoramic screen 150 for forming a 360 degree panoramic image, disadvantages of uneven resolution and four corners being idled can be improved, and the vertical FOV (field of vision) can be increased. In addition, the lens 160 can be served to provide functions such as zooming in, zooming out, partially enlarging or reducing the size, changing depth of field or other functions. Accordingly, the panoramic projecting system provided by the present invention is novel and more practical in use comparing to the conventional panoramic projecting system.

Figure 5:
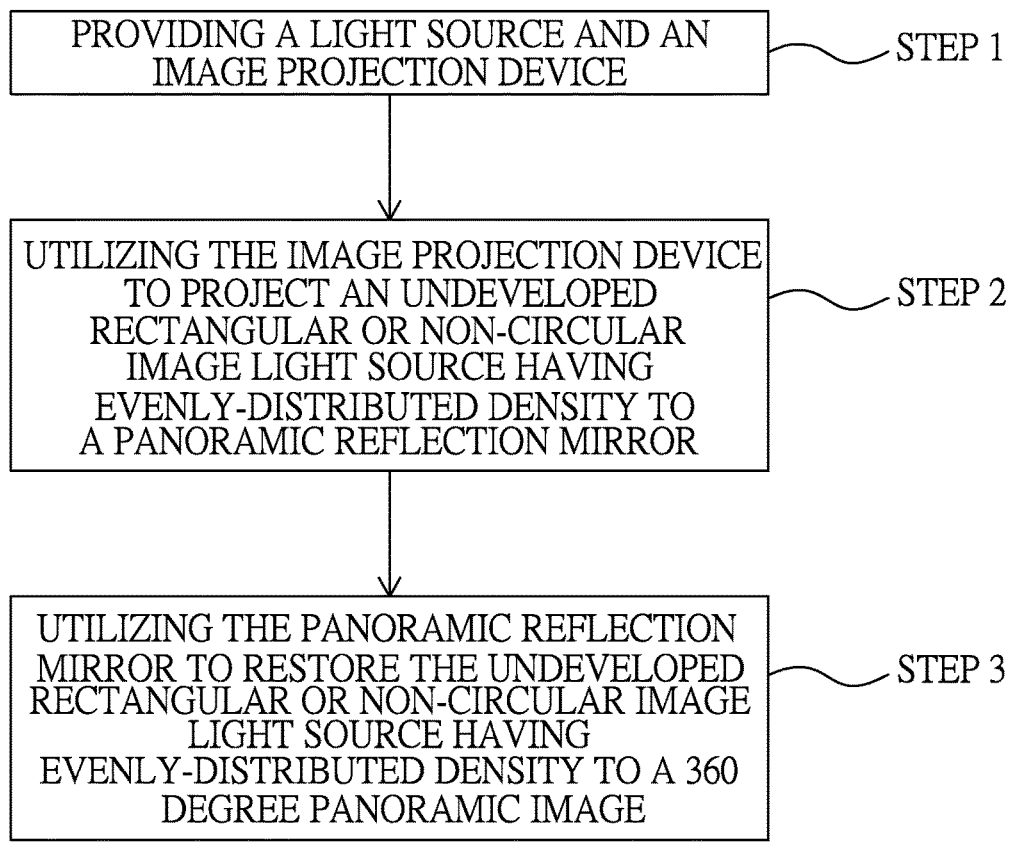
FIG. 5 is a flowchart illustrating a method of panoramic projecting according to another preferred embodiment of the present invention.

Referring to FIG. 5, which is a flowchart illustrating a method of panoramic projecting according to another preferred embodiment of the present invention.

As shown in FIG. 5, the present invention also provides a method of panoramic projecting, which includes the steps of: providing a light source and an image projection device 130 (STEP 1); utilizing the image projection device 130 to project an undeveloped rectangular or non-circular image light source having evenly-distributed density to a panoramic reflection mirror 140 (STEP 2); and utilizing the panoramic reflection mirror 140 to restore the undeveloped rectangular or non-circular image light source having evenly-distributed density to a 360 degree panoramic image (STEP 3).

In the STEP 1, a light source and an image projection device 130 are provided; wherein, the light source is e.g. but not limited to a 360 degree light source, and the image projection device 130 is e.g. but not limited to a general projector.

In the STEP 2, the image projection device 130 is utilized for projecting an undeveloped rectangular or non-circular image light source having evenly-distributed density to a panoramic reflection mirror 140; wherein, the technical characteristic of the panoramic reflection mirror 140 is as the above-mentioned therefore no further illustration is provided.

In the STEP 3, the panoramic reflection mirror 140 is utilized for restoring the undeveloped rectangular or non-circular image light source having evenly-distributed density to a 360 degree panoramic image; wherein, the panoramic image is a 360 degree panoramic image and formed as a panoramic image with the real-world proportion.

Figure 6:
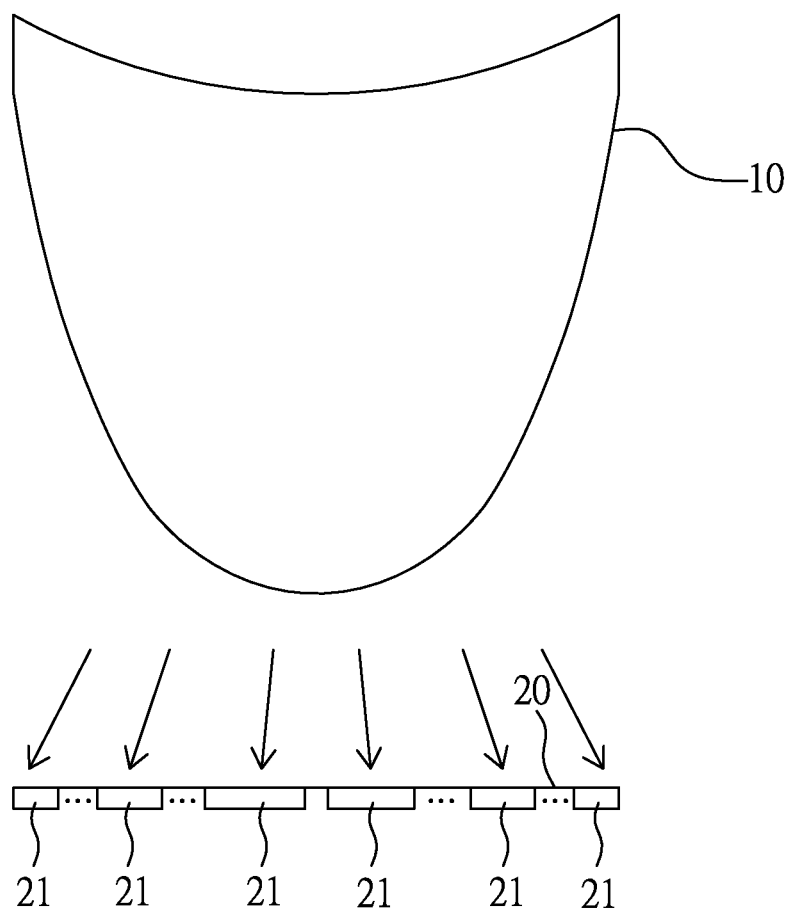
FIG. 6 is a schematic view illustrating a panoramic image sensor according to one another preferred embodiment of the present invention.

Referring to FIG. 6, which is a schematic view illustrating a panoramic image sensor according to one another preferred embodiment of the present invention.

As shown in FIG. 6, the present invention also provides a panoramic image sensor, which is used in a panoramic viewing system, the image sensor 20 includes a plurality of photo sensing units 21 arranged in the image sensor 20, and the photo sensing units 21 are respectively formed with different photo sensing areas according to the arranged locations, wherein the photo sensing areas of the photo sensing units 21 are determined by an elliptical conical curved surface 11 of a panoramic reflection mirror 10, the area with lower illuminance is formed with a larger photo sensing area, the area with higher illuminance is formed with a smaller photo sensing area. Wherein, the technical characteristic of the panoramic reflection mirror 10 is as the above-mentioned therefore no further illustration is provided; the ambient light source is e.g. but not limited to a 360 degree light source; and the gradient of the curved surface 11 is defined by the linear relation of the image projected by the panoramic reflection mirror 10 to the image sensor 20.

Wherein, the photo sensing unit 21 is e.g. but not limited to a photodiode, a charge-coupled device, a complementary metal-oxide semiconductor or other photo sensitive material. As shown in FIG. 6, the photo sensing unit 21 closer to the central area of the image sensor 20 is formed with a larger photo sensing area due to the lower illuminance; and the photo sensing unit 21 closer to the outer area of the image sensor 20 is formed with a smaller photo sensing area due to the higher illuminance. As such, the disadvantage of the conventional image sensor having an attenuation effect which directly affects the image developing quality and the problem of relatively brighter in the center and relatively darker at the edge can be improved.

Accordingly, a disadvantage of the conventional panoramic viewing system in which the signal charge converted from the photo signal projected to the photo sensing unit 21 being formed with unevenly-distributed density can be improved; so the larger curvature radius of the curved surface 11 would have a higher density projected to the photo sensing unit 21, and the smaller curvature radius of the curved surface 11 would have a lower density projected to the photo sensing unit 21. As such, the panoramic image sensor provided by the present invention is novel and more practical in use comparing to the conventional panoramic image sensor.

Based on what has been disclosed above, advantages achieved by the panoramic viewing system of the present invention are as following: 1. a panoramic reflection mirror is provided, a specially-formed curved surface thereof allows the density of a photo signal of a light source projected by the panoramic reflection mirror to the image sensor to be evenly distributed and to be formed as a rectangular or non-circular image, thereby avoiding the disadvantages of uneven resolution and four corners being idled; 2. during projection, the rectangular or non-circular image light source projected by the panoramic reflection mirror to the 360 degree screen is formed with evenly-distributed density, thereby avoiding a disadvantage of uneven resolution, so a better resolution is provided; and 3. The area of the photodiode adopted in the image sensor and closer to the central point of the image sensor is relatively larger, and the area of the photodiode farer from the central point of the image sensor is relatively smaller, thereby enabling the sensed image to be provided with better resolution and brightness. Accordingly, the panoramic viewing system provided by the present invention is novel and more practical in use comparing to the prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A panoramic image sensor, used in a panoramic viewing system and including:
    a plurality of photo sensing units, arranged in said image sensor, and said photo sensing units being respectively formed with different photo sensing areas according to arranged locations, wherein said photo sensing areas of said photo sensing units being determined by an elliptical conical curved surface of a panoramic reflection mirror, central photo sensing areas of said photo sensing areas with lower illuminance are formed with a larger photo sensing area, and outer photo sensing areas of said photo sensing areas with higher illuminance are formed with a smaller photo sensing area;
    the different photo sensing areas of the photo sensing unit are designed to match gradients of the curved surface of the panoramic reflection mirror, different gradients of the curved surface of the panoramic reflection mirror map onto the different photo sensing areas of the photo sensing unit, the different photo sensing areas of the photo sensing unit have smaller area sizes corresponding to larger gradients of the elliptical conical curved surface of the panoramic reflection mirror and the different photo sensing areas of the photo sensing unit have larger area sizes corresponding to smaller gradients of the elliptical conical curved surface of the panoramic reflection mirror.

2. The panoramic image sensor as claimed in claim 1, wherein said photo sensing unit is a photodiode, a charge-coupled device, a complementary metal-oxide semiconductor or other photo sensitive material.

3. The panoramic image sensor as claimed in claim 1, wherein the gradient of said elliptical conical curved surface is defined by a linear relation of an image projected by said panoramic reflection mirror to said image sensor.

* * * * *